United States Patent
Elsherbini et al.

(10) Patent No.: US 11,148,814 B2
(45) Date of Patent: Oct. 19, 2021

(54) REFRIGERATION CIRCUITS, ENVIRONMENTAL CONTROL SYSTEMS, AND METHODS OF CONTROLLING FLOW IN REFRIGERATION CIRCUITS

(71) Applicant: Hamilton Sundstrand Corporation, Charlotte, NC (US)

(72) Inventors: Abdelrahman I. Elsherbini, Windsor, CT (US); Brian St. Rock, Andover, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 165 days.

(21) Appl. No.: 16/592,415

(22) Filed: Oct. 3, 2019

(65) Prior Publication Data

US 2021/0101686 A1 Apr. 8, 2021

(51) Int. Cl.
| | | |
|---|---|---|
| *B64D 13/08* | (2006.01) | |
| *B64D 13/06* | (2006.01) | |
| *F25B 5/02* | (2006.01) | |
| *F25B 49/02* | (2006.01) | |

(52) U.S. Cl.
CPC ............ *B64D 13/08* (2013.01); *B64D 13/06* (2013.01); *F25B 5/02* (2013.01); *F25B 49/02* (2013.01); *B64D 2013/0618* (2013.01)

(58) Field of Classification Search
CPC ... F25B 1/06; F25B 49/02; F25B 5/02; B64D 13/06; B64D 13/08; B64D 2013/0618
See application file for complete search history.

(56) References Cited

U.S. PATENT DOCUMENTS

| | | | |
|---|---|---|---|
| 9,657,969 B2 | 5/2017 | Vaisman et al. | |
| 10,288,325 B2 | 5/2019 | Vaisman | |
| 2004/0123624 A1 | 7/2004 | Ohta et al. | |
| 2007/0271942 A1* | 11/2007 | Yokoyama | F25B 47/02 62/278 |
| 2015/0191254 A1 | 7/2015 | Vaisman | |
| 2016/0200175 A1* | 7/2016 | Nakajima | F25B 43/00 62/500 |
| 2017/0045269 A1* | 2/2017 | Ogata | F25B 5/02 |
| 2018/0170554 A1 | 6/2018 | Elsherbini et al. | |
| 2019/0203980 A1* | 7/2019 | Cavalleri | F25B 49/02 |
| 2020/0124326 A1* | 4/2020 | Kumakura | F25B 41/00 |

FOREIGN PATENT DOCUMENTS

| | | |
|---|---|---|
| CN | 104676939 B | 8/2016 |
| WO | 2018118309 A1 | 6/2018 |

OTHER PUBLICATIONS

European Search Report; Application No. 19212735.5-1008; dated Aug. 3, 2020; 7 pages.

* cited by examiner

*Primary Examiner* — Henry T Crenshaw
(74) *Attorney, Agent, or Firm* — Cantor Colburn LLP

(57) ABSTRACT

A refrigeration circuit includes a primary loop, a secondary loop connected to the primary loop, a first expansion valve connected to the secondary loop, and a second expansion valve. The second expansion valve is connected to the secondary loop and is in parallel with the first expansion valve to control thermal communication between the refrigeration circuit and a first heat load independent of thermal communication between the refrigeration circuit and a second heat load. Environmental control systems and methods of controlling refrigerant flow in refrigeration circuits are also described.

14 Claims, 3 Drawing Sheets

REFRIGERATION CIRCUITS, ENVIRONMENTAL CONTROL SYSTEMS, AND METHODS OF CONTROLLING FLOW IN REFRIGERATION CIRCUITS

BACKGROUND

The present disclosure relates generally to environmental control, and more particularly to refrigeration circuits for environmental control systems.

Vehicles, such as aircraft, commonly include cooling systems like vapor-compression refrigeration systems and air cycle systems to remove heat from environmentally controlled zones within the vehicle. In refrigeration systems heat removal from the zones is generally accomplished by driving a refrigerant in vapor state with a compressor through a condenser, which superheats the refrigerant. The superheated refrigerant is provided to a condenser to remove heat and condense the refrigerant into a liquid. The liquid state refrigerant then traverses an expansion valve, which decreases pressure of the liquid refrigerant by flash evaporation to form a cold liquid-vapor refrigerant mixture. The cold liquid-vapor is in turn communicated to an evaporator thermally coupled to the environmentally controlled zones, the evaporator vaporizing the liquid portion of the cold liquid-vapor refrigerant mixture with heat removed from the environmentally controlled zones. In air cycle systems, heat is removed from environmentally controlled zones by compressing air, precooling the compressed air using a colder air stream, and thereafter then expanded through a turbine to provide the required cooling.

In some cooling systems the environmentally controlled zones can require cooling to different temperatures. Cooling to the different temperatures in such systems is generally accomplished by cooling air to the lower of the required temperatures and intermixing air destined to the higher of the temperature zones with warmer air. This allows the refrigeration system to satisfy the temperature requirements of each zone. Cooling air to a temperature below that required for the zone can make the cooling system operate less efficiently than otherwise possible.

Such systems and methods have generally been acceptable for their intended purpose. However, there remains a need for improved refrigeration circuits, environmental control systems, and methods of controlling refrigerant flow in refrigerant circuits and environmental control systems.

BRIEF DESCRIPTION

A refrigeration circuit is provided. A refrigeration circuit includes a primary loop, a secondary loop connected to the primary loop, a first expansion valve connected to the secondary loop, and a second expansion valve. The second expansion valve is connected to the secondary loop and is in parallel with the first expansion valve to control thermal communication between the refrigeration circuit and a first heat load independent of thermal communication between the refrigeration circuit and a second heat load.

In addition to one or more of the features described above, or as an alternative, further embodiments of the refrigeration circuit may include a first evaporator connected in series with the first expansion valve and in parallel with the second expansion valve, and a second evaporator connected in series with the second expansion valve and in parallel with the first expansion valve.

In addition to one or more of the features described above, or as an alternative, further embodiments of the refrigeration circuit may include a first heat load in thermal communication with the first evaporator and having a first heat load control temperature, the first heat load control temperature different than a second heat load control temperature of the second heat load.

In addition to one or more of the features described above, or as an alternative, further embodiments of the refrigeration circuit may include a second heat load in thermal communication with the second evaporator and having a second heat load control temperature, the second heat load control temperature different than a first heat load control temperature of the first heat load.

In addition to one or more of the features described above, or as an alternative, further embodiments of the refrigeration circuit may include a condenser connected to the primary loop and the secondary loop to condense refrigerant communicated to the primary loop, the first expansion valve, and the second expansion valve.

In addition to one or more of the features described above, or as an alternative, further embodiments of the refrigeration circuit may include a union connecting the condenser to the primary loop, the first expansion valve, and the second expansion valve.

In addition to one or more of the features described above, or as an alternative, further embodiments of the refrigeration circuit may include an ejector connected to the primary loop, the first expansion valve, and the second expansion valve by the condenser.

In addition to one or more of the features described above, or as an alternative, further embodiments of the refrigeration circuit may include a ram air duct or an overboard air conduit connected to the condenser, the condenser thermally coupling refrigerant traversing the primary loop with ram air or overboard air traversing the ram air conduit or the overboard air conduit.

In addition to one or more of the features described above, or as an alternative, further embodiments of the refrigeration circuit may include a pump arranged along the primary loop.

In addition to one or more of the features described above, or as an alternative, further embodiments of the refrigeration circuit may include a heat exchanger arranged along the primary loop and in fluid communication with the pump through the primary loop to receive pressurized refrigerant from the pump.

In addition to one or more of the features described above, or as an alternative, further embodiments of the refrigeration circuit may include a hot fluid conduit in fluid communication with the heat exchanger, the heat exchanger thermally coupling refrigerant traversing the primary loop with a hot fluid traversing the hot fluid conduit.

In addition to one or more of the features described above, or as an alternative, further embodiments of the refrigeration circuit may include an ejector coupling the primary loop to the secondary loop.

In addition to one or more of the features described above, or as an alternative, further embodiments of the refrigeration circuit may include that the ejector has a primary inlet connected to the primary loop, a secondary inlet connected to the secondary loop, and an outlet connected to the primary loop and the secondary loop.

In addition to one or more of the features described above, or as an alternative, further embodiments of the refrigeration circuit may include that the ejector has a duct including a converging portion with a secondary inlet and a diverging portion with an outlet, the secondary loop connected to the secondary inlet of the duct, the primary loop and the secondary loop connected to the outlet of the diverging portion In addition to one or more of the features described above, or as an alternative, further embodiments of the refrigeration circuit may include that the ejector has nozzle arranged within the converging portion of the duct and a primary inlet, the primary inlet connecting the primary loop to the nozzle, and therethrough to the outlet of the duct.

In addition to one or more of the features described above, or as an alternative, further embodiments of the refrigeration circuit may include a refrigerant selected from a group including hydrofluorocarbons and hydrofluoroolefins, the refrigerant traversing the primary loop and the secondary loop.

An environmental control system (ECS) is also provided. The ECS includes a refrigeration circuit as described above, a pump arranged along the primary loop, and an ejector coupling the primary loop to the secondary loop.

In addition to one or more of the features described above, or as an alternative, further embodiments of the ECS may include a first evaporator connected in series with the first expansion valve and in parallel with the second expansion valve, a second evaporator connected in series with the second expansion valve and in parallel with the first expansion valve, and a condenser connected to the primary loop and the secondary loop to condense refrigerant communicated to the primary loop, the first expansion valve, and the second expansion valve.

A method of controlling refrigerant flow is also provided. The method includes, at a refrigeration circuit as described above, controlling thermal communication between the refrigeration circuit and a first heat load independently of thermal communication between the refrigeration circuit and a second heat load.

In addition to one or more of the features described above, or as an alternative, further embodiments of the method may include condensing a refrigerant; dividing the refrigerant into a primary refrigerant flow and a secondary refrigerant flow; pressurizing the primary refrigerant flow; and heating the primary refrigerant flow. The method may further include flowing the primary refrigerant flow to an ejector; dividing the secondary refrigerant flow into a first heat load flow and a second heat load flow; expanding the first heat load flow and expanding the second heat load flow; and removing heat from a first heat load with the first heat load flow and removing heat from a second heat load with the second heat load flow. The first heat load flow with the second heat load flow are thereafter combined to form the secondary refrigerant flow and the secondary refrigerant flow communicated (flowed) to the ejector, wherein the second secondary refrigerant flow is accelerated and intermixed with the primary refrigerant flow in the ejector to form the refrigerant flow.

Technical effects of the present disclosure include the capability to control heat removal from heat loads having different control temperatures with different flows of refrigerant. Technical effects of the present disclosure also include the capability to operate the refrigeration circuit by pressurizing only a portion of the refrigerant circulating within the refrigerant circuit, limiting work required to circulate refrigerant through the refrigerant circuit. Technical effects of the present disclosure additionally include the capability to add energy to the refrigerant subsequent to it passing through the pump, and prior to communication to the ejector, using waste heat—such as from a cabin air compressor or a bleed air flow—further limiting the amount work required to circulate refrigerant through the refrigerant circuit.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
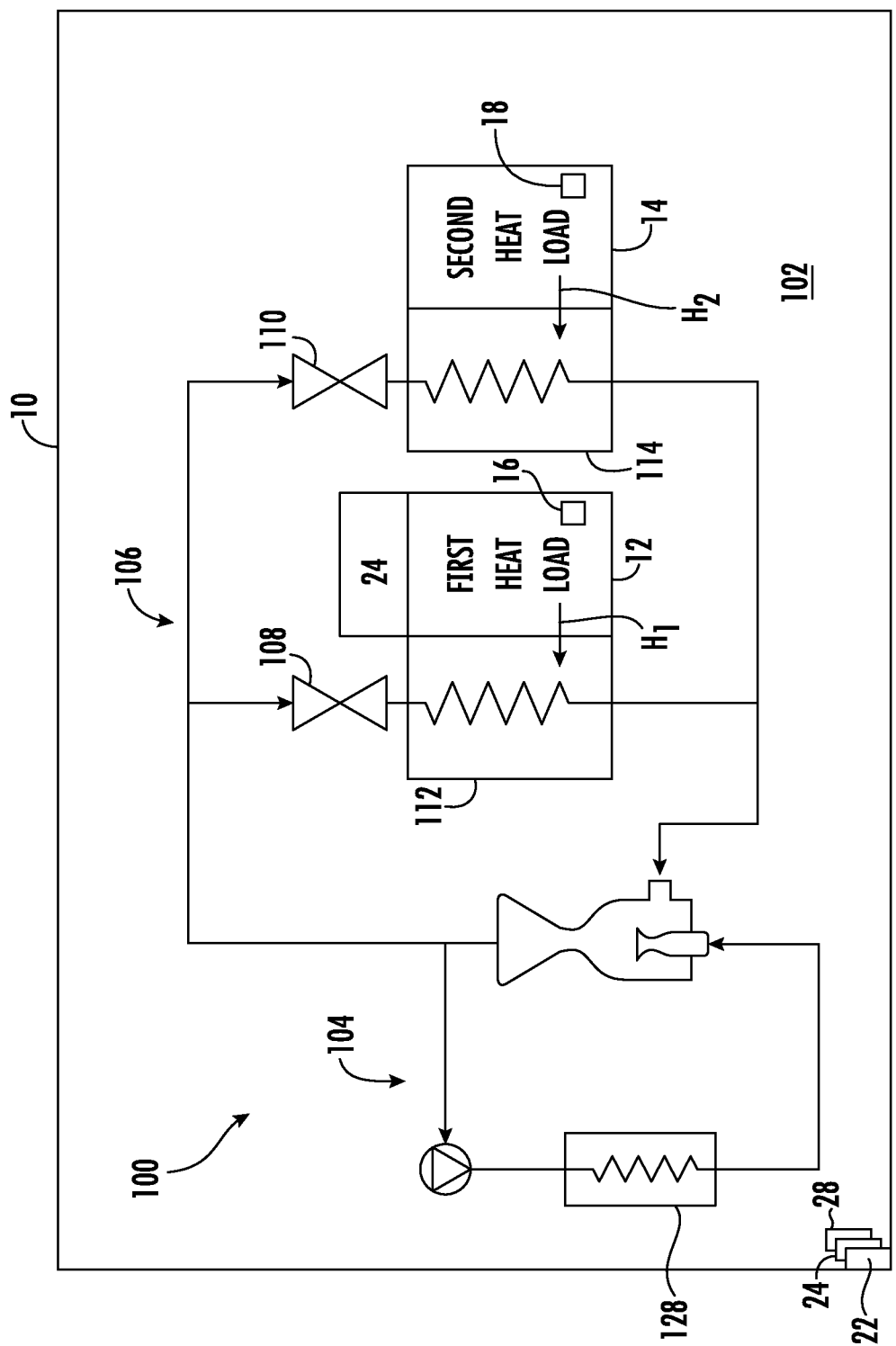
FIG. 1 is a schematic view of an aircraft having an environmental control system (ECS) constructed in accordance with the present disclosure, showing a primary loop with a pump and a secondary loop with a first and second expansion valves associated with first and second heat loads.

Reference will now be made to the drawings wherein like reference numerals identify similar structural features or aspects of the subject disclosure. For purposes of explanation and illustration, and not limitation, a partial view of an example of a refrigeration circuit constructed in accordance with the disclosure is shown in FIG. 1 and is designated generally by reference character 100. Other embodiments of refrigeration circuits, environmental control systems having refrigeration circuits, and methods of controlling refrigerant flow within refrigeration circuits in accordance with the present disclosure, or aspects thereof, are provided in FIGS. 2 and 3, as will be described. The systems and methods described herein can be used for environmental control in vehicles, such as through independently controlling flow liquid refrigerant through two of more expansion valves in thermal communication with heat loads having different control temperatures, though the present disclosure is not limited to environmental control systems having any particular number of heat loads or to vehicles in general.

Referring to FIG. 1, a vehicle 10, e.g., an aircraft, is shown. The vehicle 10 includes an environmental control system (ECS) 102 having the refrigeration circuit 100, a first heat load 12, and a second heat load 14. The refrigeration circuit 100 includes a primary loop 104, a secondary loop 106 connected to the primary loop 104, a first expansion valve 108 connected to the secondary loop 106, and a second expansion valve 110 connected to the secondary loop 106. The primary loop 104 is configured to generate a flow of evaporated refrigerant from a flow of liquid refrigerant provided to the primary loop 104. The secondary loop 106 is configured to communicate liquid refrigerant to the primary loop and the first expansion valve 108 and the second expansion valve 110. The second expansion valve 110 is connected to the secondary loop 106 and is in parallel with the first expansion valve 108 to control thermal communication $H_1$ between the refrigeration circuit 100 and the first heat load 12, independent of thermal communication $H_2$ between the refrigeration circuit 100 and the second heat load 14.

The refrigeration circuit 100 also includes a first evaporator 112 and a second evaporator 114. The first evaporator 112 is connected in series with the first expansion valve 108 and is in parallel with the second expansion valve 110. The second evaporator 114 is connected in series with the second expansion valve 110 and is in parallel with the first expansion valve 108. In this respect the first evaporator 112 provides the thermal communication $H_1$ between the refrigeration circuit 100 and the first heat load 12 according to a flow of refrigerant through the first expansion valve 108, and the second evaporator 114 provides the thermal communication $H_2$ between the refrigeration circuit 100 and the second heat load 14 according to a flow of refrigerant through the second expansion valve 110.

The first heat load 12 is in thermal communication with the first evaporator 112, e.g., via the thermal communication $H_1$, and has a first heat load control temperature 16. The second heat load 14 is in thermal communication with the second evaporator 114, e.g., via the thermal communication $H_2$, and has the second heat load control temperature 18. In certain embodiments the first heat load control temperature 16 can be equivalent to the second heat load control temperature 18 of the second heat load 14. In accordance with certain embodiments the first heat load control temperature 16 can be different than the second heat load control temperature 18 of the second heat load 14. The second heat load control temperature 18 is different than the first heat load control temperature 16 in some embodiments. Examples of heat loads include the crew cabin, passenger cabins, galley units, and the cargo compartment on an aircraft. Examples of heat loads also include portions of a single cabin, unit, or compartment of an aircraft.

As will be appreciated by those of skill in the art in view of the present disclosure, cooling zones (e.g., the first heat load 12 and the second heat load 14) having different control temperatures can be achieved by cooling air provided to the zone having the lowest control temperature and intermixing a portion of the cooled air with warmer air for provision to the zone(s) having higher control temperature(s). While generally acceptable for their intended purpose, environmental control systems that operate in this manner can operate with lower efficiency than otherwise possible. To avoid the need to operate at lower efficiency than otherwise possible, the environmental control system 102 includes the refrigeration circuit 100 with the first expansion valve 108 and the second expansion valve 110, the first expansion valve 108 controllable independent of the second expansion valve 110.

Figure 2:
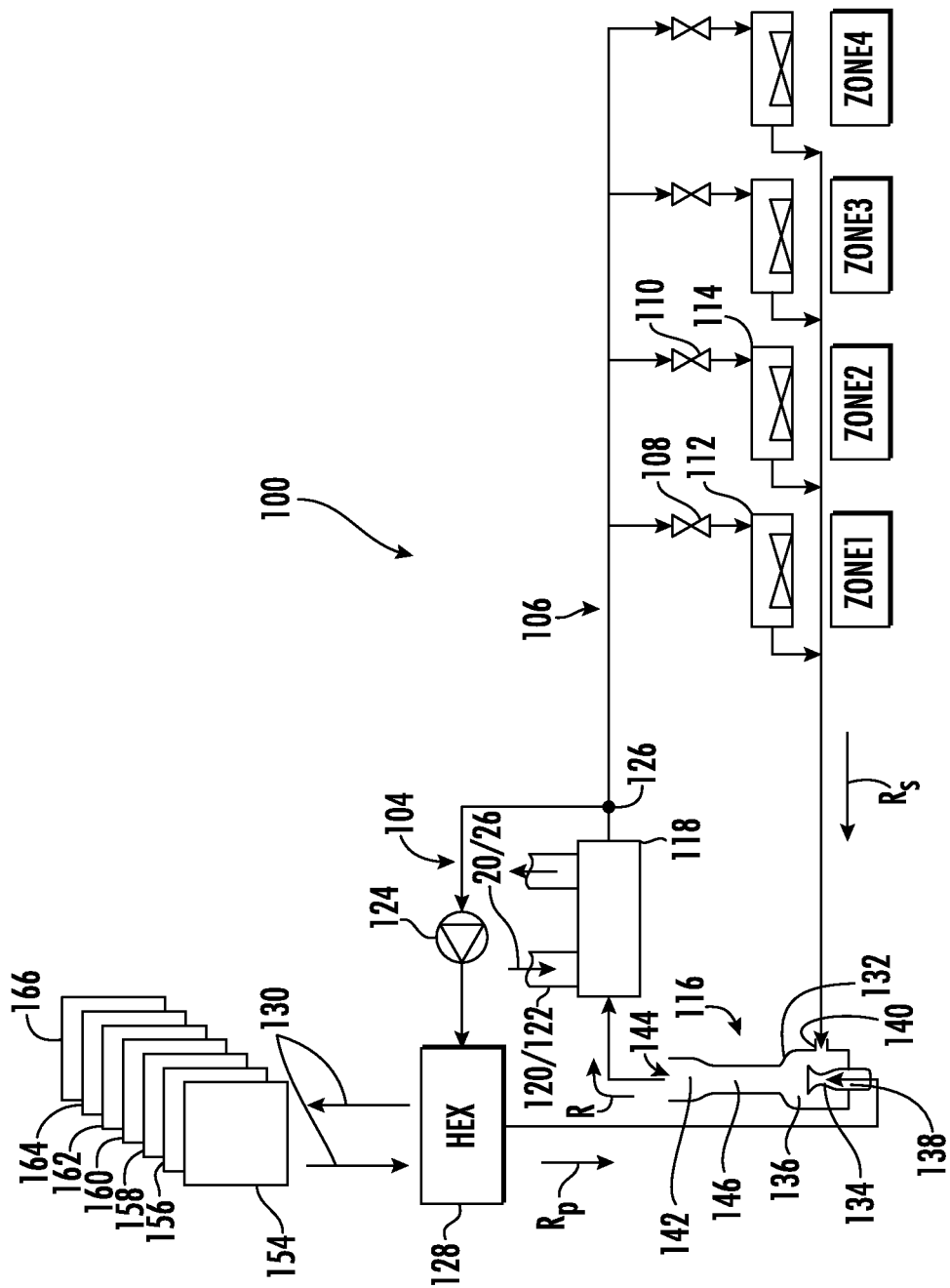
FIG. 2 is a schematic view of the ECS of FIG. 1 according to an example, showing the pump communicating a primary loop refrigerant flow through a heat exchanger and an ejector to accelerate therethrough a secondary loop refrigerant flow returned from the secondary loop.

With reference to FIG. 2, the refrigeration circuit 100 is shown. The refrigeration circuit 100 includes an ejector 116 (e.g., an ejector pump), a condenser 118, an overboard air conduit 120, and/or a ram air conduit 122. The refrigeration circuit 100 also includes a pump 124, a union 126, and a heat exchanger 128.

The ejector 116 couples the primary loop 104 to the secondary loop 106 and includes a duct 132 and a nozzle 134. The duct 132 has a converging portion 136 with a primary inlet 138 and a secondary inlet 140, and a diverging portion 142 with an outlet 144. The outlet 144 of the duct 132 is connected to the primary loop 104 and the secondary loop 106. More specifically, the outlet 144 of the duct 132 is connected to the union 126 through the condenser 118, and therethrough with the primary loop 104 and the secondary loop 106. The primary inlet 138 of the duct 132 is connected to the primary loop 104 to receive therefrom a primary loop refrigerant portion $R_p$ from the pump 124, and the secondary inlet 140 of the duct 132 is connected to the secondary loop 106 to receive therefrom a secondary loop refrigerant portion $R_S$. It is contemplated that the nozzle 134 be positioned within the converging portion 136 of the duct 132 such that a throat portion 146 of the duct 132 separates the nozzle 134 from the diverging portion 142 of the duct 132. Examples of suitable refrigerants includes hydrofluorocarbons, such as R-134a, and hydrofluoroolefins, such as R-1233zd and R-1234ze by way of non-limiting examples.

The condenser 118 is connected to the primary loop 104 and the secondary loop 106 to condense refrigerant R communicated to the primary loop 104, the first expansion valve 108, and the second expansion valve 110. More specifically the condenser 118 couples the outlet 144 of the ejector 116 to the union 126 such that an accelerated mixture of the primary refrigerant flow $R_p$ and the secondary refrigerant flow $R_S$ flows through the union 126. In certain embodiments the condenser 118 condenses substantially all the refrigerant R traversing the condenser 118 into a liquid state, enabling employment of the pump 124 and avoiding the need to employ a compressor.

In certain embodiments the overboard air conduit 120 fluidly couples an overboard air source to the condenser 118 to provide a flow of overboard air 20 to the condenser 118. The flow of overboard air 20 cools the refrigerant R traversing the condenser 118 to a liquid state prior to the refrigerant R reaching the union 126. The overboard air source can be, for example, a crew or passenger cabin 24 located within the vehicle 10 (shown in FIG. 1). As will be appreciated by those of skill in the art in view of the present disclosure, this allows the condenser to operate at lower temperature than the external environment when the external environment is warmer than the crew or passenger cabin 24.

In accordance with certain embodiments the ram air conduit 122 fluidly couples a ram air source to the condenser 118 to provide a ram air flow 26 to the condenser 118. The ram air conduit 122 The ram air flow 26 cools the refrigerant R traversing the condenser 118 to a liquid state prior to the refrigerant R reaching the union 126. The flow of ram air 26 can be provided by a ram air inlet port 22 (shown in FIG. 1) carried by the vehicle 10 (shown in FIG. 1) and fluidly coupling the condenser 118 with the external environment 30 (shown in FIG. 1). The union 126 in turn divides provides refrigerant issuing from the ejector 116 into the primary loop refrigerant portion $R_p$ and the secondary loop refrigerant portion $R_S$ for provision to the primary loop 104 and the secondary loop 106, respectively.

The pump 124 is arranged along the primary loop 104. More specifically the pump 124 couples the union 126 to the primary inlet 138 of the ejector 116 through the heat exchanger 128 of the primary loop 104 and is arranged to pressurize the primary refrigerant flow $R_p$ traversing the primary loop 104. As will be appreciated by those of skill in the art in view the present disclosure, the pump 124 requires relatively little energy per unit refrigerant traversing the pump as compared to compressors as the pump pressurizes liquid refrigerant and does not compress a gas or a gas/liquid mixture. This makes the environmental control system 102 relative efficient in comparison to systems employing compressors.

The heat exchanger 128 couples the pump 124 to the primary inlet 138 of the ejector 116 and is configured to add energy to the primary refrigerant flow $R_p$ traversing the primary loop 104, e.g., by heating primary refrigerant flow $R_p$ subsequent to pressurization by the pump 124. The heat exchanger 128 also thermally couples the primary loop 104 with a heat source 28 through a hot-side flow channel 130. More specifically, the heat exchanger 128 is arranged along the primary loop 104 and is in fluid communication with the pump 124 through the primary loop 104 to receive primary refrigerant flow $R_p$ once pressurized refrigerant from the pump 124. The hot-side flow channel 130 is in turn in thermal communication with a heat source 28 and fluidly couples the heat source 28 to the heat exchanger 128.

In certain embodiments the heat source 28 can communicate waste heat to the primary refrigerant flow $R_p$ flowing through the heat exchanger 128 through the hot-side flow channel 130. As will be appreciated by those of skill in the art in view of the present disclosure, heating the primary refrigerant flow $R_p$ with waste heat can limit (or eliminate entirely) the need to cool such hot fluid flows using additional structures and/or fluid loops—simplifying the arrangement of the vehicle 10 (shown in FIG. 1) and improving the efficiency of the refrigeration circuit 100. In accordance with certain embodiments heat the heat source can communicate heat from an engine a bleed air flow 154, a cabin-air-compressor air flow 156, and/or an electronics-cooling air flow 158 to the primary refrigerant flow $R_p$ flowing through the heat exchanger 128 through the hot-side flow channel 130. It is also contemplated that the heat source can communicate heat from a water/glycol flow 160, a fuel flow 162, a lubricant flow 164, and/or a refrigerant-vapor flow 166 into primary refrigerant flow $R_p$ flowing through the heat exchanger 128. Although specific examples heat source are listed herein it is to be understood and appreciated that other sources of heat can also be employed to add energy to the primary refrigerant flow $R_p$ refrigerant subsequent to pressurization by the pump 124, as suitable for an intended application.

In the illustrated example the environmental control system 102 include four (4) expansion valve/evaporator sets each tied to a zone. This is for illustration purposes only and is non-limiting. As will be appreciated by those of skill in the art in view of the present disclosure, the environmental control system 102 can have fewer than four (4) expansion valve/evaporator sets or more than four (4) expansion valve/evaporator sets, as suitable for an intended application.

Figure 3:
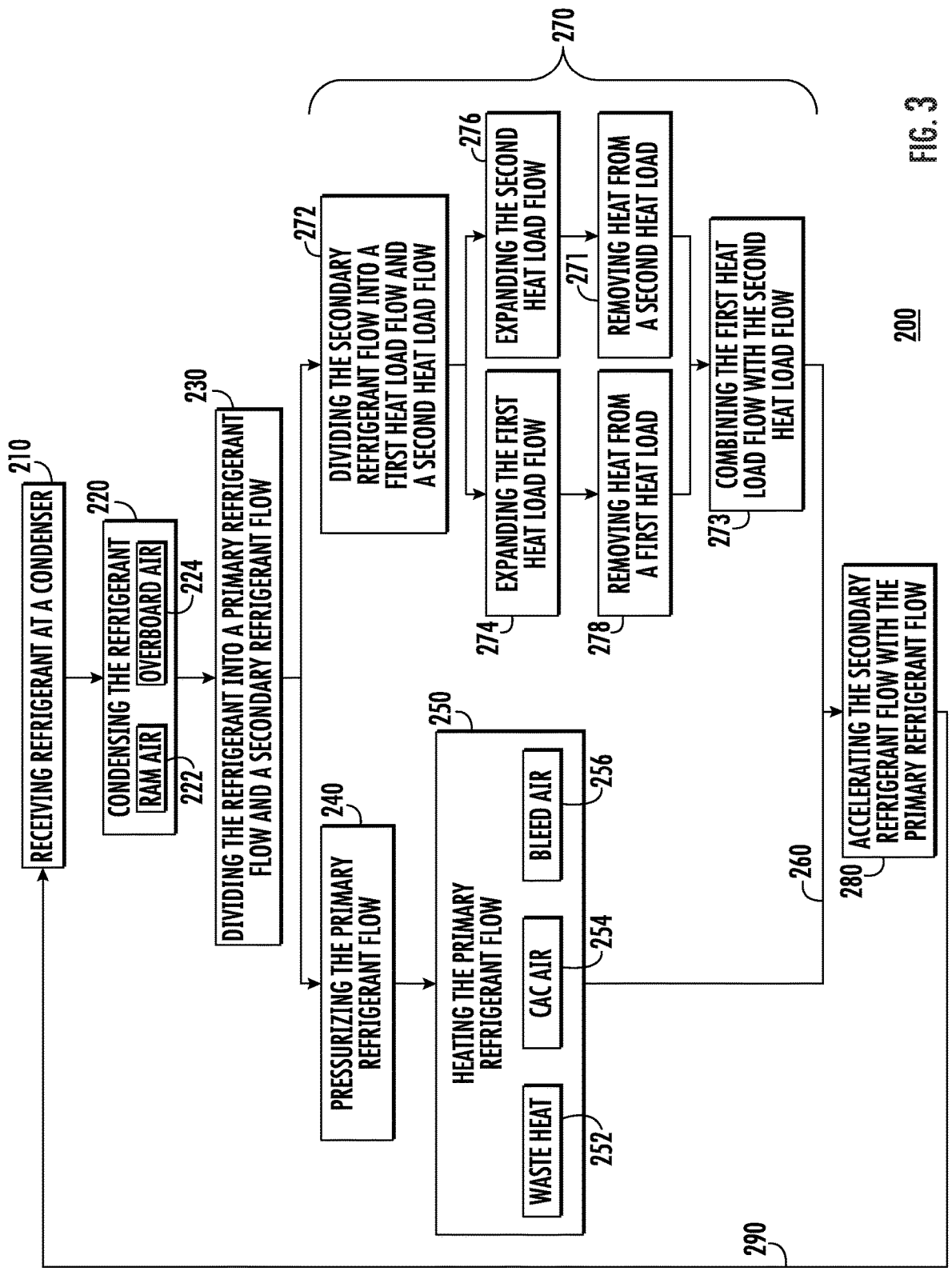
FIG. 3 is a block diagram of a method of controlling refrigerant flow through an ECS, showing operations of the method according to an illustrative and non-limiting example of the method.

With reference to FIG. 3, a method 200 of controlling refrigerant flow through a refrigeration circuit, e.g., the refrigeration circuit 100 (shown in FIG. 1), is shown. As shown with box 210, a refrigerant flow is received at a condenser, e.g., the condenser 118 (shown in FIG. 2). As shown with box 220 the refrigerant flow is condensed at the condenser. The refrigerant flow can be condensed using a ram air flow, e.g., the ram air flow 20 (shown in FIG. 2), or an overboard air flow, e.g., the overboard air flow 26 (shown in FIG. 2), as show with boxes 222 and 224. The refrigerant flow is then divided into a primary refrigerant flow and a second refrigerant flow, e.g., the primary refrigerant flow $R_C$ (shown in FIG. 2) and the secondary refrigerant flow RE (shown in FIG. 2), as shown with box 230. Division can be done, for example, at the union 126 (shown in FIG. 2).

As shown with box 240, the primary refrigerant flow is pressurized. Pressurization can occur, for example, using the pump 124 (shown in FIG. 2). Once pressurized the primary refrigerant flow is heated, as shown with box 250. Heating can be accomplished using a fluid flow containing waste heat such as from an electronics cooling system, a cabin air compressor air flow, and/or a bleed air flow, as shown with boxes 252-256. The primary refrigerant flow is then provided to an ejector, e.g., the ejector 116 (shown in FIG. 2), as shown with arrow 260.

As shown with bracket 270, the method 200 includes controlling thermal communication between the refrigeration circuit, e.g., the refrigeration circuit 100 (shown in FIG. 1), and a first heat load, e.g., the first heat load 12 (shown in FIG. 1), independently from thermal communication between the refrigeration circuit and a second heat load, e.g., the second heat load 14 (shown in FIG. 1). In this respect the secondary refrigerant flow is divided into a first heat load flow and a second heat load flow, as shown with box 272. The first heat load flow is expanded, e.g., using the first expansion valve 108 (shown in FIG. 1), and communicated to a first heat load whereat heat, e.g., heat $H_1$ (shown in FIG. 1), is communicated from the first heat load to the first heat load flow, as shown with boxes 274 and 278. The second heat load flow is also expanded, e.g., using the second expansion valve 110 (shown in FIG. 1), and communicated to a second heat load whereat heat, e.g., heat $H_2$ (shown in FIG. 1), is communicated from the second heat load to the second heat load flow, as shown with boxes 276 and 271.

As shown with box 273, the first heat load flow and the second heat load flow combined to form (e.g., re-establish) the secondary refrigerant flow. The secondary refrigerant flow is then provided to the ejector, as shown with arrow 260, and the secondary flow accelerated and intermixed with the primary refrigerant flow in the ejector, as shown with box 280. Once accelerated and intermixed the primary refrigerant flow and the secondary refrigerant flow are provided to the condenser as the refrigerant flow, as shown with arrow 290.

Environmental control systems can provide temperature control to thermals loads on an aircraft by cooling refrigerant to the lowest temperature zone required and adjusting air flow and mixing with the warmer air. Lower temperature thermal loads may be relatively, forcing the environmental control system to operate at lower efficiencies.

In embodiments described herein an ejector loop is employed to provide cooling to two or more heat loads. The ejector loop circulates refrigerant to two or more expansion valve/evaporator sets associated with respective heat loads. Refrigerant flow through each expansion valve/evaporator is controlled by the expansion valve for cooling required by the respective heat load and returned to a secondary inlet port of an ejector. The ejector accelerates the refrigerant received at the second inlet port of the ejector using refrigerant received at a primary inlet port of the ejector. The accelerated refrigerant is provided to a splitter positioned within the ejector loop. The splitter diverts a portion of the accelerated refrigerant to a pumping loop, which pressurizes the accelerated refrigerant, heats the pressurized coolant using heat harvested from a heat source, and returns the pressurized refrigerant to the primary inlet port of the ejector. The remainder of the accelerated refrigerant flows through the ejector loop to the two or more thermal loads.

The present disclosure provides the capability to control temperature at two or more heat loads at expansion valve/evaporator sets associated with respective heat loads through variable refrigerant flow. In certain embodiments the present disclosure provides the capability to modulate refrigerant flow and cooling to individual loads. In accordance with certain embodiments the present disclosure allows the evaporator associated with a given heat load to operate at the temperature of the heat load and not the lowest required temperature of the heat loads coupled to the environmental control system. It is also contemplated that, in accordance with certain embodiments, the condenser of the environmental control system can reject heat to an overboard conditioned air flow. Further efficiency improvement can be realized when the overboard air temperature is below that of the ambient ram air temperature.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigeration circuit, comprising:
a primary loop;
a secondary loop connected to the primary loop;
a first expansion valve arranged along the secondary loop and connected therethrough to the primary loop;
a second expansion valve arranged along the secondary loop and connected therethrough to the primary loop;
wherein the second expansion valve is connected to the secondary loop and in parallel with the first expansion valve to control thermal communication between the refrigeration circuit and a first heat load independently from the thermal communication between the refrigeration circuit and a second heat load;
a condenser connected to the primary loop and the secondary loop to condense refrigerant communicated to the primary loop, the first expansion valve, and the second expansion valve; and
an ejector connected to the primary loop, the first expansion valve, and the second expansion valve by the condenser.

2. The refrigeration circuit of claim 1, further comprising a union connecting the condenser to the primary loop, the first expansion valve, and the second expansion valve.

3. The refrigeration circuit of claim 1, further comprising an ejector coupling the primary loop to the secondary loop.

4. The refrigeration circuit of claim 3, wherein the ejector has a primary inlet connected to the primary loop, a secondary inlet connected to the secondary loop, and an outlet connected to the primary loop and the secondary loop.

5. The refrigeration circuit of claim 3, wherein the ejector comprises a duct having a converging portion with a secondary inlet and a diverging portion with an outlet, the secondary loop connected to the secondary inlet of the duct, the primary loop and the secondary loop connected to the outlet of the diverging portion.

6. The refrigeration circuit of claim 5, wherein the ejector has a nozzle arranged within the converging portion of the duct and a primary inlet, the primary inlet connecting the primary loop to the nozzle, and therethrough to the outlet of the duct.

7. The refrigeration system of claim 1, further comprising a refrigerant selected from a group including hydrofluorocarbons and hydrofluoroolefins, the refrigerant traversing the primary loop and the secondary loop.

8. A refrigeration circuit, comprising:
a primary loop;
a secondary loop connected to the primary loop;
a first expansion valve arranged along the secondary loop and connected therethrough to the primary loop;
a second expansion valve arranged along the secondary loop and connected therethrough to the primary loop;
wherein the second expansion valve is connected to the secondary loop and in parallel with the first expansion valve to control thermal communication between the refrigeration circuit and a first heat load independently from thermal communication between the refrigeration circuit and a second heat load;
a condenser connected to the primary loop and the secondary loop to condense refrigerant communicated to the primary loop, the first expansion valve, and the second expansion valve; and
a ram air duct or an overboard air conduit connected to the condenser, the condenser thermally coupling refrigerant traversing the primary loop with ram air or overboard air traversing the ram air conduit or the overboard air conduit.

9. A refrigeration circuit, comprising:
a primary loop;
a secondary loop connected to the primary loop;
a first expansion valve arranged along the secondary loop and connected therethrough to the primary loop;
a second expansion valve arranged along the secondary loop and connected therethrough to the primary loop;
wherein the second expansion valve is connected to the secondary loop and in parallel with the first expansion valve to control thermal communication between the refrigeration circuit and a first heat load independently from thermal communication between the refrigeration circuit and a second heat load; and
a pump arranged along the primary loop.

10. The refrigeration circuit of claim 9, further comprising a heat exchanger arranged along the primary loop and in fluid communication with the pump through the primary loop to receive pressurized refrigerant from the pump.

11. The refrigeration circuit of claim 9, further comprising a hot fluid conduit in fluid communication with the heat exchanger, the heat exchanger thermally coupling refrigerant traversing the primary loop with a hot fluid traversing the hot fluid conduit.

12. An environmental control system, comprising:
a refrigeration circuit, comprising:
a primary loop;
a secondary loop connected to the primary loop;
a first expansion valve arranged along the secondary loop and connected therethrough to the primary loop; and
a second expansion valve arranged along the secondary loop and connected therethrough to the primary loop;
wherein the second expansion valve is connected to the secondary loop and in parallel with the first expansion valve to control thermal communication between the refrigeration circuit and a first heat load independently from thermal communication between the refrigeration circuit and a second head load;
a pump arranged along the primary loop; and
an ejector coupling the primary loop to the secondary loop.

13. The environmental control system of claim 12, further comprising:
- a first evaporator connected in series with the first expansion valve and in parallel with the second expansion valve;
- a second evaporator connected series with the second expansion valve and in parallel with the first expansion valve; and
- a condenser connected to the primary loop and the secondary loop to condense refrigerant communicated to the primary loop, the first expansion valve, and the second expansion valve and a secondary inlet.

14. A method of controlling refrigerant flow, comprising:
- at a refrigeration circuit including a primary loop, a secondary loop connected to the primary loop, a first expansion valve connected to the secondary loop, and a second expansion valve connected to the secondary loop and in parallel with the first expansion valve;
- controlling thermal communication between the refrigeration circuit and a first heat load independently of thermal communication between the refrigeration circuit and a second heat load;
- condensing a refrigerant;
- dividing the refrigerant into a primary refrigerant flow and a secondary refrigerant flow;
- pressurizing the primary refrigerant flow;
- heating the primary refrigerant flow;
- flowing the primary refrigerant flow to an ejector;
- dividing the secondary refrigerant flow into a first heat load flow and a second heat load flow;
- expanding the first heat load flow and expanding the second heat load flow;
- removing heat from a first heat load with the first heat load flow and removing heat from a second heat load with the second heat load flow;
- combining the first heat load flow with the second heat load flow to form the secondary refrigerant flow;
- flowing the secondary refrigerant flow to the ejector; and
- accelerating, and intermixing therein, the secondary refrigerant flow with the primary refrigerant flow in the ejector to form the refrigerant flow.

* * * * *